UNITED STATES PATENT OFFICE.

WILLIAM B. ABERT AND WILLIAM SCHERER, OF WASHINGTON, DISTRICT OF COLUMBIA.

PAINT.

SPECIFICATION forming part of Letters Patent No. 491,003, dated January 31, 1893.

Application filed October 8, 1892. Serial No. 448,175. (No specimens.)

*To all whom it may concern:*

Be it known that we, WILLIAM B. ABERT and WILLIAM SCHERER, citizens of the United States, residing at Washington, in the District of Columbia, have invented certain new and useful Improvements in Paint; and we do hereby declare the following to be a full, clear, and exact description of the invention, such as will enable others skilled in the art to which it appertains to make and use the same.

Our invention has relation to paints, and has for its object the provision of a mixture or compound adapted to be used in place of that compound or mixture known to the trade as "white lead ground in oil."

The white lead of commerce, which is the chief basis of all pigments, is a mixture of plumbic carbonate and hydrate, and is expensive, owing to the high price of lead and the complex and costly process necessary to the proper manufacture and refinement of the commercial material.

It is the purpose of our invention to produce a mixture containing as a base materials less costly than lead, and which may be manufactured at less expense, and our invention consists in a paint mixture or compound composed of mica, reduced to an impalpable powder, linseed oil, gypsum and tragacanth.

We wish it to be particularly understood that the mica which we employ is reduced previously to its admixture with the other materials, to an absolutely impalpable powder, as we are aware that mica has been used in connection with adhesive materials to form a decorative coating, but the mica has been in these mixtures merely in an imperfectly divided or flocculent condition, the purpose being to produce an effect of iridescence or sheen by the reflection of light from the small particles of mica, whereas it is our purpose to produce a mixture which will be substantially the same in appearance, when applied, as white lead paint.

We are also aware that it has been proposed to mix pulverized and bolted mica or fossil meal with a base consisting of the distilled unbroken residuum of bituminous-gas-coal tar for the purpose of producing a fire proof paint, but our composition differs from this in having the base composed of mica in the form of an impalpable powder instead of being in the flaky form which it presents when merely pulverized and bolted and in being the principal and necessary ingredient of the composition.

In preparing our mixture or compound, we grind the pulverized mica and gypsum separately with linseed or other suitable oil until each is thoroughly mixed with the oil. We then grind these two mixtures together, adding tragacanth.

We have found the following a suitable and satisfactory formula for our mixture or compound.

| | Per cent. |
|---|---|
| Mica | 78.5 |
| Gypsum | 18 |
| Oil | 3 |
| Tragacanth | .5 |
| | 100 |

The proportion of mica used may be varied to a considerable extent, it being practicable to use as high as eighty-five per cent. or as low as thirty per cent. and yet produce a satisfactory result—the proportions of gypsum and oil varying, of course, with the variations in the proportion of the mica.

It is to be noted that no material is employed in our mixture or compound which will chemically act on or affect the mica, and we are aware that it has been proposed to produce a species of water-glass by mixing mica with materials which will dissolve the same; but in these chemical compounds produced by dissolving mica in other materials, the mica changes its character and loses the opacity which, when it is ground to an impalpable powder, and mixed with other materials, as described, renders it a suitable substitute for white lead in paint mixtures.

The various pigments or chromo colors commonly used in connection with white lead for the production of colored paints may be employed for the same purpose with our improved mixture or compound, and the mixture is in fact used in precisely the same manner, and for the same purposes, as white lead ground in oil.

Having described our invention, we claim:—

1. A base for the manufacture of mixed paints consisting of mica reduced to an impalpable powder and ground with oil.

2. A paint compound consisting of a base of mica reduced to an impalpable powder and ground with oil, a pigment and a binder.

In testimony whereof we affix our signatures in presence of two witnesses.

WILLIAM B. ABERT.
WILLIAM SCHERER.

Witnesses:
S. G. HOPKINS,
JOS. B. CONNOLLY.